(12) United States Patent
Hong et al.

(10) Patent No.: US 8,395,502 B2
(45) Date of Patent: Mar. 12, 2013

(54) RFID SYSTEM USING CIRCULAR POLARIZED ANTENNA

(75) Inventors: Jin Kuk Hong, Hwaseong (KR); Jeong Ki Ryoo, Daejeon (KR); Jae Yul Choo, Yongin (KR)

(73) Assignee: LS Industrial Systems Co., Ltd., Anyang-Si, Gyeonggi-Do (KR)

( * ) Notice: Subject to any disclaimer, the term of this patent is extended or adjusted under 35 U.S.C. 154(b) by 482 days.

(21) Appl. No.: 12/720,307

(22) Filed: Mar. 9, 2010

(65) Prior Publication Data

US 2010/0231387 A1 Sep. 16, 2010

(30) Foreign Application Priority Data

Mar. 10, 2009 (KR) ........................ 10-2009-0020443

(51) Int. Cl.
*G08B 13/00* (2006.01)
(52) U.S. Cl. ....................................................... 340/541
(58) Field of Classification Search .................. 340/541, 340/572.1–572.9, 10.1, 505, 539.23; 343/893
See application file for complete search history.

(56) References Cited

U.S. PATENT DOCUMENTS

| | | | | |
|---|---|---|---|---|
| 6,513,015 | B2* | 1/2003 | Ogasawara | ................... 705/26.1 |
| 7,782,189 | B2* | 8/2010 | Spoonhower et al. | ... 340/539.12 |
| 2005/0200476 | A1 | 9/2005 | Forr et al. | |
| 2007/0008112 | A1 | 1/2007 | Covannon et al. | |
| 2007/0034694 | A1 | 2/2007 | Jensen et al. | |
| 2007/0052540 | A1 | 3/2007 | Hall et al. | |
| 2007/0222609 | A1* | 9/2007 | Duron et al. | ................ 340/572.7 |

FOREIGN PATENT DOCUMENTS

| | | |
|---|---|---|
| JP | 03-289578 | 12/1991 |
| JP | 2002-230642 | 8/2002 |
| JP | 2004-265112 | 9/2004 |
| JP | 2004-295599 | 10/2004 |
| JP | 2005-157572 | 6/2005 |
| JP | 2005-204130 | 7/2005 |
| JP | 2006-062611 | 3/2006 |
| JP | 2006-113629 | 4/2006 |
| JP | 2006-319710 | 11/2006 |
| JP | 2008-083739 | 4/2008 |
| JP | 2008-269452 | 11/2008 |
| JP | 2009-025987 | 2/2009 |
| KR | 1020070090510 | 9/2007 |
| KR | 1020090001648 | 1/2009 |
| WO | 2007/076895 | 7/2007 |

\* cited by examiner

*Primary Examiner* — Phung Nguyen
(74) *Attorney, Agent, or Firm* — Lee, Hong, Degerman, Kang & Waimey

(57) ABSTRACT

The present disclosure relates to an RFID (Radio frequency identification) system using circular polarized antennas, wherein a reader emits electromagnetic wave through reader antennas to recognize a tag and to read out customer information if a customer proximity is detected, where the reader antennas are installed at a kiosk body and at a rear proximity position of a floor surface on which a customer using the kiosk stands, and the reader antennas installed at the rear proximity position of the floor surface emits circular polarizing wave toward the kiosk, whereby the tag can be accurately recognized regardless of position of the tag of the customer.

5 Claims, 5 Drawing Sheets

RFID SYSTEM USING CIRCULAR POLARIZED ANTENNA

CROSS-REFERENCE TO RELATED APPLICATIONS

Pursuant to 35 U.S.C. §119 (a), this application claims the benefit of earlier filing date and right of priority to Korean Patent Application No. 10-2009-0020443, filed on Mar. 10, 2009, the contents of which are hereby incorporated by reference in their entirety

BACKGROUND OF THE DISCLOSURE

1. Field

The present disclosure relates to an RFID (Radio Frequency Identification) system using a circular polarized antenna.

2. Background

Many kinds of kiosks including an unmanned search system, an automatic telling machine, an unmanned ticket counter and an automatic vending machine are developed and installed to the benefit of customers.

The kiosks are recently equipped with an RFID system which provides many conveniences such as verifying a customer using the kiosk, and providing a special value-added service to a verified customer. The kiosk equipped with an RFID system is mounted with a reader and a plurality of reader antennas. The customers using the kiosk are respectively issued with tags stored with customer information.

In a case a customer issued with a tag uses a kiosk, the reader reads out the customer information stored in the tag through the reader antenna, where the kiosk verifies the customer using the read-out customer information and provides a special predetermined value-added service to a particular customer.

However, the reader suffers from a disadvantage in that it consumes unnecessary power because it keeps emitting electromagnetic wave through the reader antennas regardless of whether customers have the tags in order to recognize the tags carried by the customers using the kiosk. The reader antennas are conventionally attached on a front side of the kiosk to recognize the tag carried by the customer.

In a case a customer carries a tag in front of a customer body, the reader can easily read out the customer information stored in the tag via the reader antennas.

However, in a case a customer carries a tag in a hip pocket or at a leg instead of a front of a body, the reader cannot correctly recognize the tag, failing to read out the customer information, whereby a special predetermined value-added service cannot be provided to the customer.

In a case the power emitted from the reader antennas is increased, the reader can correctly recognize the tag even if the customer keeps the tag in the hip pocket or at the leg and can provide the customer information stored in the tag.

However, in a case the power emitted from the reader antennas is increased, there may be created a problem of a tag being erroneously operated by recognizing a tag of a customer currently using the kiosk in addition to a tag of a customer waiting in line behind the former customer.

SUMMARY

The present disclosure is disclosed to obviate the above-mentioned disadvantages, and it is an object of the present disclosure to provide an RFID (Radio Frequency Identification) system using a circular polarized antenna configured to detect whether a customer has approached a kiosk within a set-up distance in order to use the kiosk, and to emit an electromagnetic wave only if the customer has approached within the set-up distance to thereby reduce the unnecessary power consumption.

Another object is to provide an RFID (Radio Frequency Identification) system using a circular polarized antenna configured to allow a reader to accurately recognize the position of a tag regardless of the tag position of the customer, and to accurately read out customer information stored in the tag.

Still another object is to provide an RFID (Radio Frequency Identification) system using a circular polarized antenna configured to use a reader antenna having a circular polarized characteristic, thereby maintaining an excellent recognition performance of a tag regardless of directions of a tag carried by a customer.

In one general aspect of the present disclosure, an RFID (Radio frequency identification) system using circular polarized antennas, comprising: a proximity sensor mounted at a kiosk for sensing whether a customer has proximately approached; a customer detector configured to detect whether the customer has proximately approached the kiosk using a sensing signal of the proximity sensor; a server configured to request customer information and provide the customer with services based on the customer information if the customer detector detects that the customer has approached the kiosk; and a reader configured to recognize the tag by emitting an electromagnetic wave through a plurality of reader antennas if the server requests the customer information and to read out the customer information stored in the tag that has recognized the customer and to provide the read-out customer information to the server.

In some exemplary embodiments, the plurality of reader antennas may comprise: a first reader antenna and a second reader antenna each mounted at an upper portion and a middle portion of a kiosk body; and a third reader antenna mounted at a rear proximity position of a floor surface on which the customer currently using the kiosk stands.

In some exemplary embodiments, the third reader antenna slantingly emits the electromagnetic wave toward the kiosk body.

In some exemplary embodiments, the slanted emission angle of the electromagnetic wave is within a range of 100 300 based on a perpendicular line.

In some exemplary embodiments, the third reader antenna is formed with a plurality of circular polarized antennas of 2×2 array, where a circular polarized antenna arranged near the kiosk and another circular polarized antenna arranged far from the kiosk have mutually different phases.

In some exemplary embodiments, a signal phase delay value applied to the plurality of circular polarized antennas of 2×2 array is 0 for two circular polarized antennas positioned at a rear based on the kiosk body, and a range of −450 −650 for two circular polarized antennas positioned at the front.

Advantageous Effects

The RFID (Radio Frequency Identification) system using a circular polarized antenna according to the present disclosure is advantageous in that a proximity sensor is used to detect whether a customer has approached a kiosk within a set-up distance in order to use the kiosk, and an electromagnetic wave is emitted only if the customer has approached within the set-up distance to thereby reduce the unnecessary power consumption.

Another advantage of the RFID (Radio Frequency Identification) system using a circular polarized antenna according to the present disclosure is that a reader antenna is arranged at a proximate position of a rear floor surface on which a customer stands to allow the electromagnetic wave to be slantedly emitted at approximately 20° toward the customer such that the reader antenna can accurately recognize the tag and read out customer information stored in the tag regardless of tag position.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description, serve to explain the principle of the disclosure. In the drawings.

DETAILED DESCRIPTION

Figure 1:
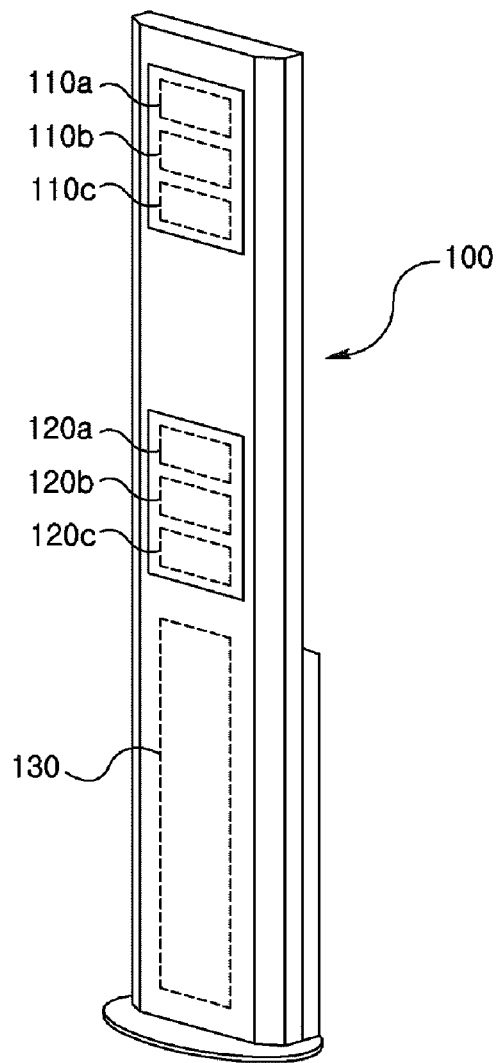
FIG. 1 is a block drawing illustrating a state where reader antennas and a reader are installed at a kiosk according to prior art.

Hereinafter, exemplary embodiments of the present disclosure are described in detail with reference to the accompanying drawings. Detailed descriptions of well-known functions, configurations or constructions are omitted for brevity and clarity so as not to obscure the description of the present disclosure with unnecessary detail. Furthermore, the same reference numerals will be assigned to the same elements in the explanation of the figures.

FIG. 1 is a block drawing illustrating a state where reader antennas and a reader are installed at a kiosk according to prior art, where reference numeral 100 is a kiosk body. The kiosk body 100 is formed at upper and middle sections with a plurality of reader antennas (110a, 110b, 110c) (120a, 120b, 120c), and is formed at a bottom section with a reader (130).

The reader (130) mounted at the RFID system of the kiosk body (100) generates a predetermined frequency, and the generated predetermined frequency is supplied to the plurality of reader antennas (110a, 110b, 110c) (120a, 120b, 120c).

The plurality of reader antennas (110a, 110b, 110c) (120a, 120b, 120c) emits electromagnetic wave to the front of the kiosk body (100) in response to a signal provided by the reader (130).

Under this circumstance, in a case a customer approaches the kiosk body (100) within a predetermined distance in order to use the kiosk carrying an RFID tag, the tag recognizes the electromagnetic wave emitted by the plurality of reader antennas (110a, 110b, 110c) (120a, 120b, 120c), and an intercommunication is performed between the reader (130) and the tag to allow the reader to read out the customer information pre-stored in the tag.

The reader (130) in the RFID system can easily read out the customer information stored in the tag by performing a communication with the tag carried by the customer through the plurality of reader antennas (110a, 110b, 110c) (120a, 120b, 120c). However, there are cases where the customers carry the tag at blind spots such as hip pockets or legs instead of a front of the body of the customer where the electromagnetic wave emitted by the plurality of reader antennas (110a, 110b, 110c) (120a, 120b, 120c) cannot reach. In this case, the reader (130) cannot accurately recognize the tag to fail to read out the customer information.

Figure 2:
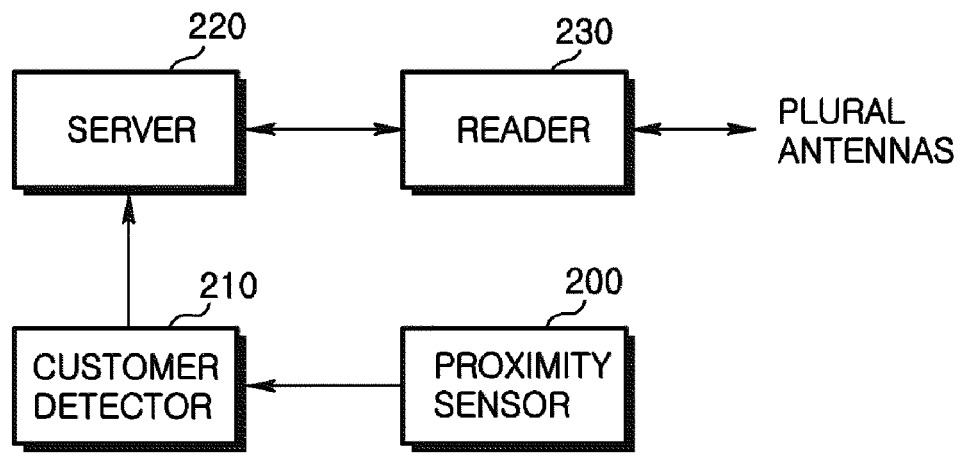
FIG. 2 is a circuit diagram illustrating a configuration of an RFID system according to an exemplary embodiment of the present disclosure.

FIG. 2 is a circuit diagram illustrating a configuration of an RFID system according to an exemplary embodiment of the present disclosure, where reference numeral 200 is a proximity sensor. The proximity sensor (200) is installed at the kiosk to detect a customer approaching the kiosk within a predetermined distance, whereby a detection signal is generated.

Reference numeral 210 is a customer detector. The customer detector (210) detects whether a customer has approached the kiosk within a predetermined distance using an output signal from the proximity sensor (200).

Reference numeral 220 is a server. The server (220) requests the customer information if the customer detector (210) detects the proximity of the customer, and controls in such a manner that a predetermined service can be provided based on the customer information.

Reference numeral 230 is a reader which is installed inside the kiosk body. The reader (230) emits the electromagnetic wave through the plurality of reader antennas in a case the server (220) requests the customer information to recognize the tag, and reads out the customer information stored in the tag and provides the customer information to the server (220).

In the RFID system thus configured according to the present disclosure, the proximity sensor (200) detects the proximity of a customer approaching the kiosk to use the service of the kiosk, and the customer detector (210) detects whether the customer has been detected using the detection signal from the proximity sensor (200).

In a case the customer detector (210) has detected the customer, the server (220) controls the reader (230) using the detection signal from the customer detector (210) to read out the customer information.

Then, the reader (230) emits the electromagnetic wave via the plurality of antennas to determine whether the tag carried by the customer has been recognized.

Under this circumstance, in a case the customer carrying the tag is positioned within a predetermined set-up distance, the reader (230) recognizes the tag, communicates with the recognized tag and reads out the customer information stored in the tag. The reader (230) transmits the read-out customer information to the server (220) to allow the server (220) to check the customer information, whereby a value-added service is made to be provided if a relevant customer is entitled to receiving a special value-added service.

In the RFID system thus configured, the proximity of a customer is detected by the proximity sensor (200), and if the proximity of the customer is detected, the reader (230) emits the electromagnetic wave through the plurality of reader antennas.

Therefore, the RFID system does not emit the electromagnetic wave if there is no customer approaching the kiosk, whereby unnecessary power consumption can be reduced.

Figure 3:
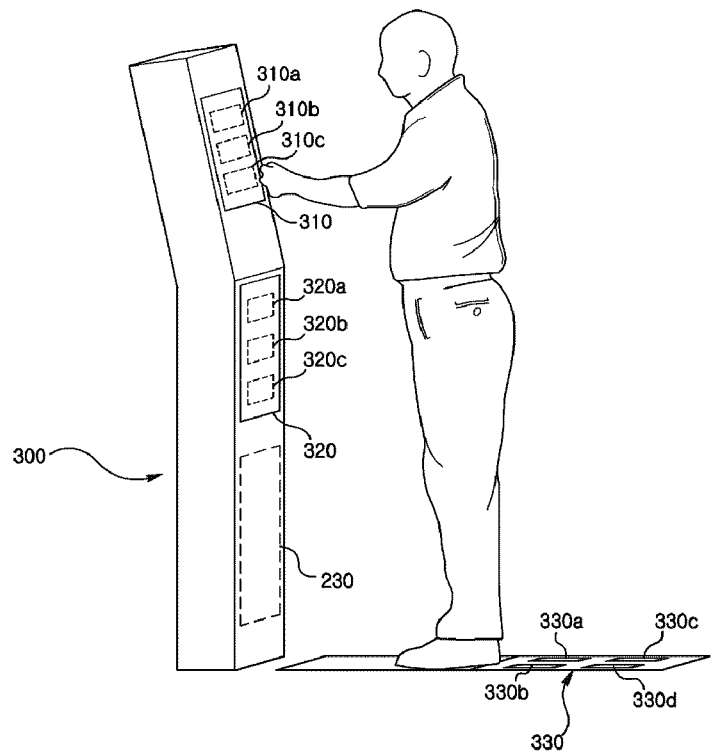
FIG. 3 is a schematic view illustrating an RFID system installed at a kiosk according to an exemplary embodiment of the present disclosure.

FIG. 3 is a schematic view illustrating an RFID system installed at a kiosk according to an exemplary embodiment of the present disclosure, where reference numeral 300 is a kiosk body. The first and second reader antennas comprising a plurality of antennas (310a, 310b, 310c) (320a, 320b, 320c) are respectively mounted at upper and middle sections of the kiosk body (300), and the reader (230) is embedded at a bottom inner side of the kiosk body (300).

A plurality of circular polarized antennas (330a, 330b, 330c, 330d) is installed at a rear proximity area of the floor surface on which a customer using the kiosk stands, where a third reader antenna (330) is installed that slantingly emits the electromagnetic wave toward the kiosk body.

In the RFID system thus configured, in a case a tag carried by a customer is recognized, the reader (230) generates a predetermined frequency, and the generated predetermined frequency is applied to the first, second and the third antennas (310) (320 (330), where electromagnetic wave is emitted by the first, second and the third antennas (310) (320 (330) to recognize the tag carried by the customer, and the customer information stored in the tag is read out by the reader.

At this time, the customer information is detected by recognizing the only tag carried by a customer currently using the kiosk, and a tag of a customer waiting in line behind the customer currently using the kiosk must not be recognized. To this end, the electromagnetic wave emitted by the first, second and the third antennas (310) (320 (330) is limited.

Figure 4:
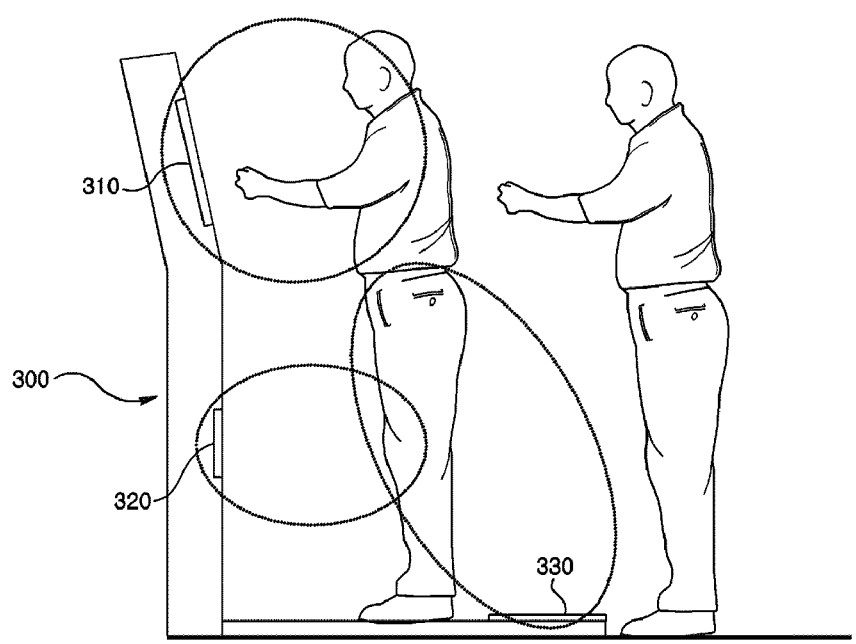
FIG. 4 is a schematic view illustrating a radiation shape of electromagnetic wave emitted by first, second and third reader antennas according to the present disclosure.

FIG. 4 is a schematic view illustrating a radiation shape of electromagnetic wave emitted by the first, second and third reader antennas (310) (320 (330) when a customer is positioned at a front of the kiosk body (300) according to the present disclosure.

Referring to FIG. 4, in a case a plurality of customers is positioned at a front of the kiosk body (300), the first, second and third reader antennas (310) (320 (330) installed at the kiosk body (300) emit electromagnetic wave toward the customers, whereby tags carried by the customers at each front of the customer body can be recognized.

The third antenna (330) installed at a proximity position of a rear floor surface of a customer emits the electromagnetic wave at a slanted emission angle within a range of 100 300 based on a perpendicular line.

Therefore, the third antenna (330) can recognize the tags carried at a hip and leg portion of the customers using the kiosk. To this end, the third reader antenna (330) uses a plurality of circular polarized antennas (330a, 330b, 330c, 330d).

Figure 5:
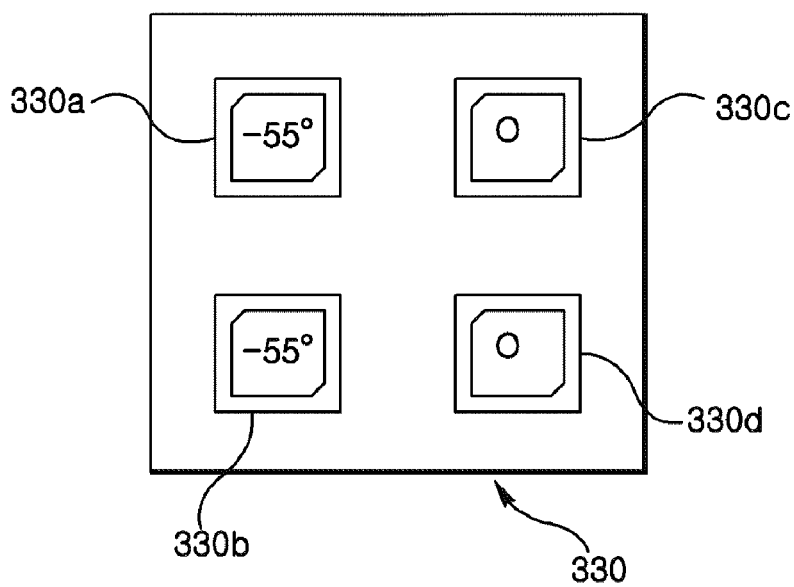
FIG. 5 is a plan view illustrating a third reader antenna in an RFID system according to the present disclosure.

FIG. 5 is a plan view illustrating a configuration of the third reader antenna (330) in an RFID system according to the present disclosure.

Referring to FIG. 5, The third reader antenna according to the present disclosure is formed with a plurality of circular polarized antennas (330a, 330b, 330c, 330d) of 2×2 array, where the circular polarized antennas (330a, 330b) arranged near the customer are delayed in signal phase delay value over the remaining circular polarized antennas (330c, 330d) arranged far from the customer. For instance, a signal phase delay value applied to the plurality of circular polarized antennas (330c, 330d) of 2×2 array is 0, while a signal phase delay value for two circular polarized antennas (330a, 330b) is within a range of −450 −650, preferably −550.

Figure 6:
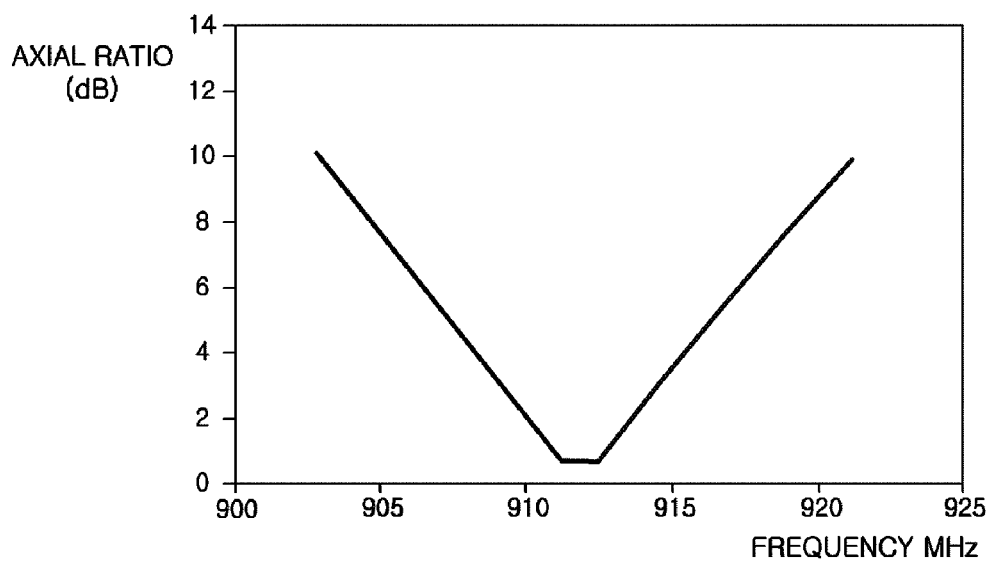
FIG. 6 is a schematic view illustrating a 3D radiation shape of electromagnetic wave emitted by a third reader antenna in an RFID system according to the present disclosure.

Then, the electromagnetic wave emitted by the third reader antenna (330) is slantedly emitted at approximately 100 300 toward the kiosk body based on a perpendicular line, as shown in FIG. 6, whereby even if the customer carries a tag at a hip or a leg, the tag can be accurately recognized and customer information stored in the tag can be read out.

FIG. 6 is a schematic view illustrating a 3D radiation shape of electromagnetic wave emitted by a third reader antenna in an RFID system according to the present disclosure.

Figure 7:
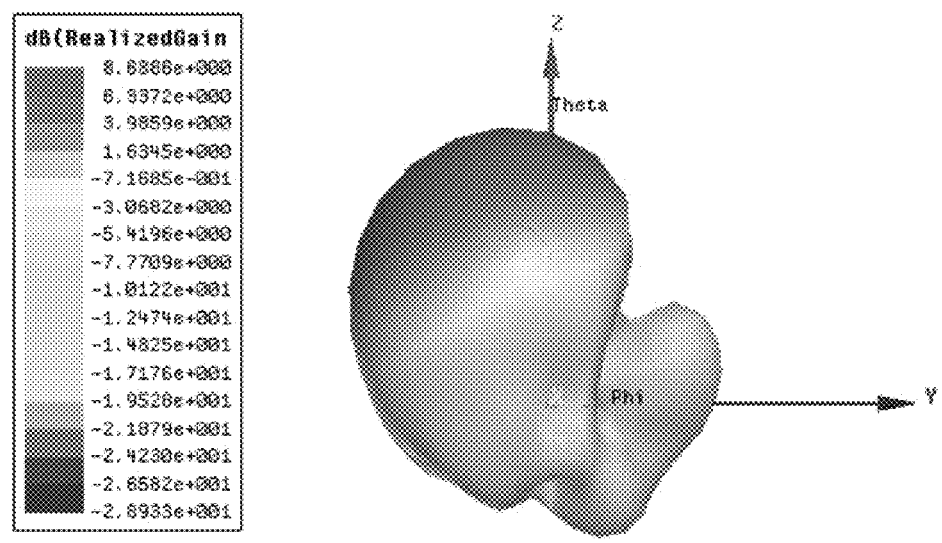
FIG. 7 is a schematic view illustrating an axial ratio characteristic of a third antenna in an RFID system according to the present disclosure.

FIG. 7 is a schematic view illustrating an axial ratio characteristic of a third antenna in an RFID system according to the present disclosure.

Referring to FIG. 7, the third reader antenna has an axial ratio bandwidth of 908 914 MHz to satisfy the frequency band of the RFID.

Figure 8A:
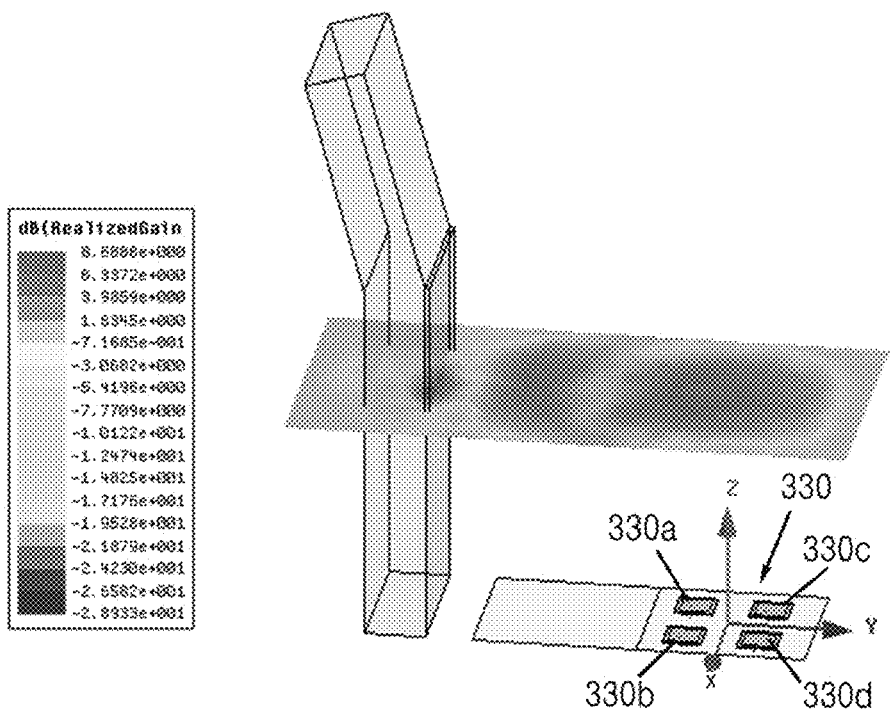
FIGS. 8a, 8b and 8c are schematic view illustrating an E field intensity of electromagnetic wave emitted by a third reader antenna in an RFID system according to the present disclosure.
Figure 8B:
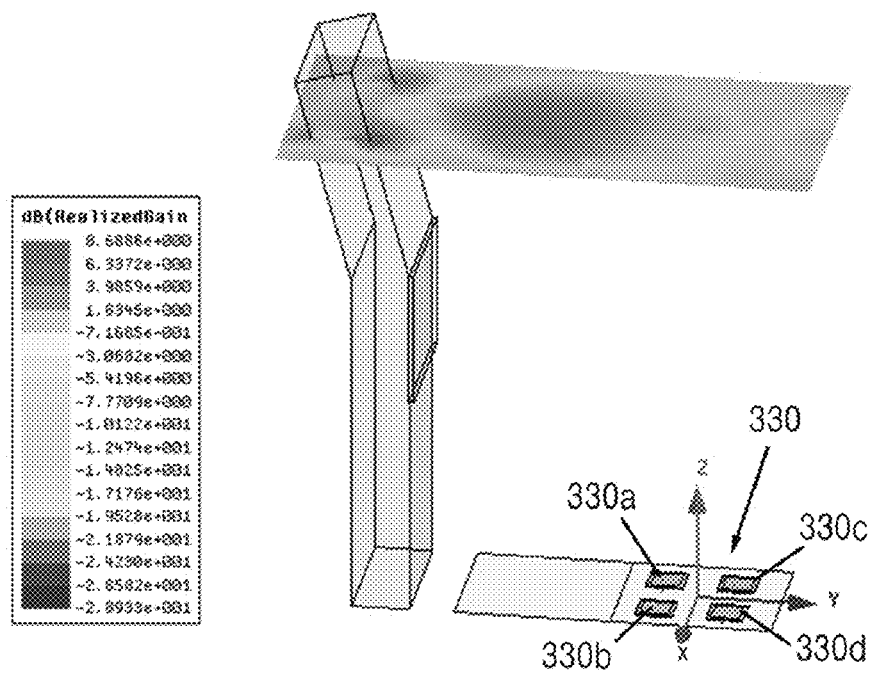
Figure 8C:
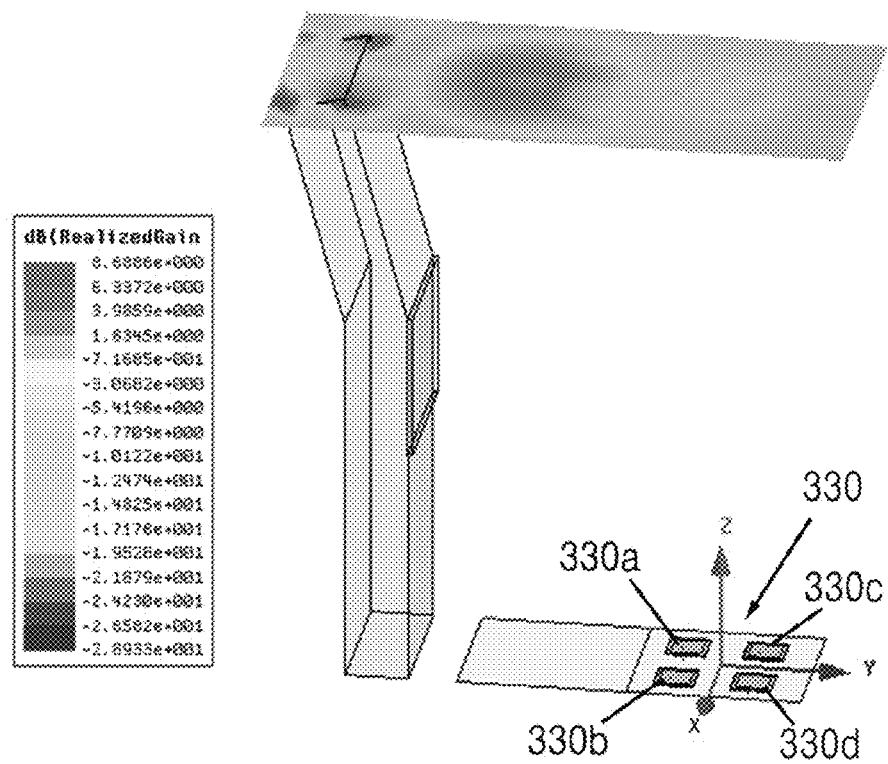

FIGS. 8a, 8b and 8c are schematic view illustrating an E field intensity of electromagnetic wave emitted by a third reader antenna in an RFID system according to the present disclosure.

Referring to FIGS. 8a, 8b and 8c, the electromagnetic wave emitted by the third reader antenna (330) is slantedly emitted at approximately 100 300 toward the kiosk body based on a perpendicular line, whereby even if the customer carries a tag at a hip or a leg, the tag can be accurately recognized and customer information stored in the tag can be read out.

While the present disclosure has been particularly shown and described with reference to exemplary embodiments thereof, the general inventive concept is not limited to the above-described embodiments. It will be understood by those of ordinary skill in the art that various changes and variations in form and details may be made therein without departing from the spirit and scope of the present invention as defined by the following claims.

What is claimed is:

1. An RFID (Radio frequency identification) system using circular polarized antennas, the RFID system comprising:
   a proximity sensor mounted at a kiosk and configured to sense proximity of a customer to the kiosk;
   a customer detector configured to detect whether the customer has proximately approached the kiosk by using a sensing signal from the proximity sensor;
   a server configured to request customer information and provide the customer with services based on the customer information if the customer detector detects that the customer has proximately approached the kiosk; and
   a reader configured to:
      recognize a tag by emitting an electromagnetic wave through a plurality of reader antennas when the server requests the customer information;
      read the customer information stored in the recognized tag; and
      provide the customer information to the server,
   wherein the plurality of reader antennas comprises:
      a first reader antenna mounted on an upper portion of a body of the kiosk
      a second reader antenna mounted at a middle portion of the body of the kiosk; and
      a third reader antenna mounted at a rear proximity position of a floor surface on which the customer stands.

2. The system of claim 1, wherein the third reader antenna is configured to emit the electromagnetic wave toward the body of the kiosk at an angle.

3. The system of claim 2, wherein the angle is within a range of 10°~30° with respect to a perpendicular line.

4. The system of claim 1, wherein:
   the third reader antenna is formed with a plurality of circular polarized antennas of a 2×2 array; and
   a first of the plurality of circular polarized antennas arranged near the kiosk and a second of the plurality of circular polarized antennas arranged far from the kiosk have mutually different phases.

5. The system of claim 4, wherein a signal phase delay value applied to the plurality of circular polarized antennas of the 2×2 array is 0 for two of the plurality of circular polarized antennas positioned at a rear of the body of the kiosk and within a range of −45°~−65° for two circular polarized antennas positioned at the front of the body of the kiosk.

* * * * *